Jan. 2, 1951  G. M. FLEMING  2,536,878
ELECTRON LENS
Filed Dec. 3, 1948
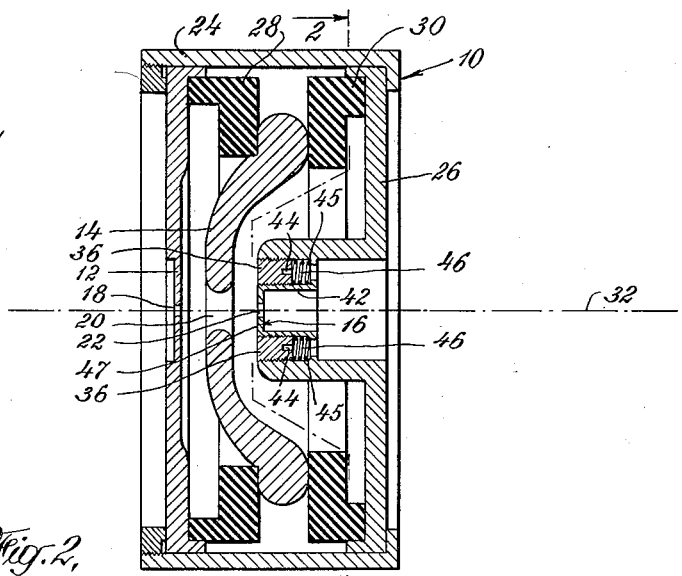
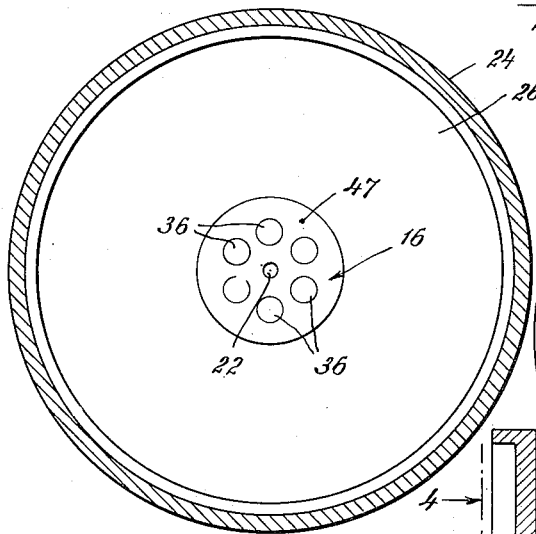
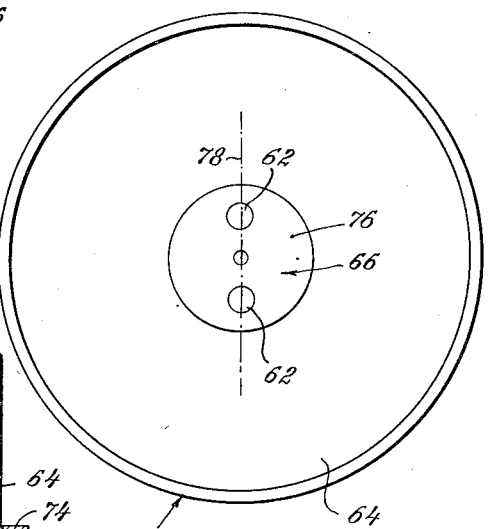
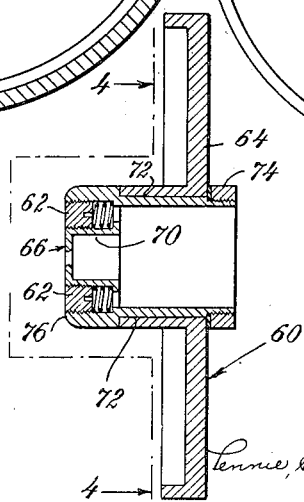
INVENTOR
GERTRUDE M. FLEMING
BY
Pennie, Edmonds, Morton and Barrows
ATTORNEYS

Patented Jan. 2, 1951

2,536,878

UNITED STATES PATENT OFFICE 2,536,878

ELECTRON LENS

Gertrude M. Fleming, Ardsley, N. Y., assignor to Farrand Optical Co., Inc., a corporation of New York Application December 3, 1948, Serial No. 63,418

2 Claims. (Cl. 250—49.5)

This invention relates to electron lenses of the electrostatic type and to the correction of aberrations in the images produced thereby.

Electrostatic lenses for influencing beams of charged particles such as electrons may be produced by combinations of charged electrodes, the electrodes usually possessing symmetry in a common axis. Two or more such lenses may be combined to provide a compound magnifying instrument analogous to the microscopes of light optics, and the extreme shortness of the wave length associated with electrons when suitably accelerated for the illumination of an object and passage through the lens implies a very much higher potential resolving power than can be achieved with instruments employing visible light.

Electron lenses, however, whether of the magnetic or electrostatic type, suffer from the various third-order aberrations known to light optical lenses in spite of the minute apertures employed, and to additional aberrations due to imperfections in the form of the electrodes or magnetic poles employed, their conductivity, permeability, etc. The combined effect of these aberrations has been to limit the resolution obtainable with electron microscopes to a fraction of that which is indicated as theoretically possible by the associated wave length of the electrons employed.

In particular in the case of electrostatic lenses, any departure from axial symmetry in the geometry of the lens structure results in a loss of axial symmetry in the focusing fields produced by the lens. The term "axial symmetry" as here used implies that in the active lens space close to the axis the electrodes and the equi-potential surfaces of the field conform to surfaces of revolution about the lens axis. As a result of axial asymmetry the images produced by the lens are impaired in stigmatic quality. The impairment in stigmatic quality is due at least in part to variation in focal distance of the lens around the lens axis, i. e., as a function of azimuth. The variation in focal distance will hereinafter be referred to as astigmatism, although it may differ from the third-order aberration of that name which appears in light optical systems even of perfect axial symmetry. The term "focal distance" is here used to mean the distance from the lens center, i. e., from a point fixed with respect to the lens structure, to the point on the axis at which a fan of meridian rays will be brought to focus. It is used in preference to the term "focal length" because of variation in the position from which the latter quantity is measured with departure of the marginal rays of the fan in question from the lens axis.

Among the various departures from axial symmetry of lenses composed of apertured diaphragm electrodes the most detrimental to image formation are defects in the apertures of the electrodes, although variations in the thickness of the electrode diaphragms and lack of perpendicularity in their orientation to the lens axis also contribute. The diaphragm apertures which surround the lens axis and the electron beam should have a perfectly circular section in planes perpendicular to the axis of the system, although their peripheries as seen in meridian planes may have any desired shape. Even extremely minute eccentricities in the electrode apertures result in variation in the focal distance with azimuth around the axis which is responsible for serious blurring of the image points.

Experience has shown that the image defects due to lack of axial symmetry are often the limiting factor on resolution even in high grade electron lenses, the errors due to this cause overshadowing such errors as spherical aberration and others which occur even in perfect axially symmetric lenses.

It has been previously proposed to correct electron lenses of the magnetic type for axial asymmetry by means of permeable iron rods radially arranged at the lens center, i. e., between the magnetic pole tips of such lenses (James Hillier and E. G. Ramberg, Journal of Applied Physics, vol. 18, No. 7, p. 48). The method disclosed in that publication is not applicable to electrostatic lenses because of the extremely critical interdependence between the shape of the lens electrodes of electrostatic lenses, especially the electrodes at the center of the lens, and the resultant fields. So critical in fact is the criterion of circularity of the aperture of the center electrode of a three-electrode lens that attempts to correct "out of round" apertures even by lapping often result in over-correction and a worse degree of astigmatism in another azimuth.

In addition the high electric field gradients existing in the neighborhood of the central electrode make it undesirable to interrupt the smooth surface thereof with discontinuities of any sort.

I have found that in electrostatic lenses a much finer control of focal distance may be achieved by a variation of the axial spacing of the electrodes of the lens. Variation in the spacing between the center and end electrodes of the usual three-electrode electrostatic lens has only some $\frac{1}{10}$ of the effect on focal distance as has the same dimensional variation when applied directly to the diameter of the aperture of the center electrode of such a lens.

According to my invention I provide a method and means of correcting for a lack of symmetry of the lens electrodes in the axis of the system by varying the electrode spacing in selected meridian or azimuth values of the lens.

In the accompanying drawings:

Fig. 1 is an axial section through a three-electrode electrostatic lens embodying my invention in one form;

Fig. 2 is an end view of the right-hand electrode of the lens of Fig. 1 as indicated by the section line 2—2 in Fig. 1;

Fig. 3 is a sectional view of a compensating electrode embodying my invention in another form; and Fig. 4 is an end view of the electrode of Fig. 3 as indicated by the line 4—4 of Fig. 3.

Referring now to Fig. 1, an electrostatic electron lens, which may for example be the objective lens in an electron microscope, is generally indicated at 10. The lens 10 includes three electrodes 12, 14 and 16 each of which consists of an appropriately shaped diaphragm. The electrodes 12, 14 and 16 are provided respectively with central apertures 18, 20 and 22 and, except for certain departures made in the electrode 16 to be described below which do not affect the electron behavior of the lens in its initial adjustment, each electrode is, within the limits imposed by imperfections of manufacture, symmetric in an axis passing through its aperture. The electrodes are made of conductive material and are mounted in a cylindrical lens cell 24 so that their axes of symmetry coincide as closely as possible in a common axis 32. Ring type spacers 28 and 30 made of insulating material support the center electrode 14 coaxially within the lens cell and give it the proper axial spacing from the electrodes 12 and 16. Means are provided whereby a large potential difference can be maintained between the center electrode 14 and the lens cell to which the other electrodes are grounded.

In use in an electron microscope, for example, the center electrode 14 may be held negative with respect to the end electrodes by the same potential difference which is employed to accelerate the electrons in an electron gun (not shown), which is located to the left of the figure and which directs an electron beam along the axis of symmetry 32 into the lens from the left. A condenser lens may or may not be employed between the electron gun and the objective lens 10.

The front electrode 12 of the lens of Fig. 1 is shaped to permit support of a specimen immediately outside the aperture 18 in the vicinity of the first principal focal point of the lens. The exit electrode 16, on the other hand, has a substantial axial throw between its central aperture 22 and its supporting flange 26 in order to permit the use of insulating spacers 28, 30 of adequate size.

Unavoidable imperfections in the axial symmetry of the lens 10 often result in astigmatism in the images produced thereby.

To correct selectively according to azimuth the focal distance of the lens of Fig. 1, I provide in the lens one electrode in which the axial spacing thereof from the adjacent electrode or electrodes can be selectively varied as a function of azimuth. A reduction in the spacing between two electrodes of the lens produces an increase in the focal distance of the lens, and vice versa. Similarly a reduction in the spacing between two electrodes in a given azimuth produces an increase in the focal distance of the lens in that azimuth, and vice versa.

In the lens of Fig. 1 the exit electrode 16 is provided with a plurality of conducting pins or plugs 36 disposed about the center aperture 22 of the electrode, with provision for their individual adjustment axially of the lens. The electrode 16 may possess on the side exposed toward the center electrode 14 the usual shape of the uncompensated electrodes of the prior art. Externally of the lens, electrode 16 is provided with a thickened web 42 surrounding its central aperture. The web 42 is drilled and tapped with holes parallel to the axis 32 in order to accommodate the movable pins 36 in pairs, the pins of each pair being preferably disposed along a diameter of the central aperture and at equal distances from the center of the aperture, as illustrated in Fig. 2. The central aperture diameter on which a pair of pins is located will be referred to as the axis of the pin-pair, although it is of course perpendicular to the axis 32 of the lens. The pins may be adjusted axially of the lens by convenient means such as screwdriver slots 44. Retaining springs 46 between the pins and seats 45 in web 42 prevent any backlash in the threaded engagement between the pins and the web 42.

The pins of each pair are preferably disposed at the same distance from the lens axis, with the pairs lying on diameters at equal azimuthal separation from each other. Three pairs of pins, equally spaced in azimuth, are adequate for varying the axial spacing with the required selectivity in azimuth. Either a larger or smaller number of pairs may be provided if desired. If only two pairs of pins are provided, their axes should however be disposed otherwise than at right angles, preferably at about 60°, in order to produce the required selectivity in azimuth. Otherwise pins rotatable in azimuth must be provided as shown in Figs. 3 and 4.

When the lens is originally manufactured the inner face 47 of the electrode 16 is polished with the pins 36 in place to produce as far as possible an electrode symmetric in the axis 32. Proper adjustment of the pins 36 permits correction of the lens for astigmatism due to residual asymmetry anywhere in the lens by compensating for unequal power initially possessed by the lens in different meridian planes. Since the focal distance increases as the spacing decreases, advancing the pins into the lens space at a given azimuth increases the focal distance in the meridian plane at that azimuth, whereas retracting the pins decreases the focal distance in the meridian plane at that azimuth.

Although it impairs the sharpness of all in-focus images, for purposes of correction the astigmatism exhibited by an electron lens having axial asymmetries is most conveniently observed in the azimuthal variation of the breadth of certain out-of-focus fringes commonly referred to as Fresnel diffraction fringes which appear around the edges of out-of-focus images of openings in opaque or partially opaque films serving as object for the lens. As the breadth of the fringes varies with departure from focus, variation in fringe width for variously oriented edges in a single image provides a measure of the variation in power of the lens with azimuth, i. e. a measure of the astigmatism of the lens.

The meridian plane of the lens whose power is associated with the appearance of fringes along an edge of given azimuthal orientation in the image is the meridian plane perpendicular to that edge.

The observation of the fringes requires a high degree of magnification, so that the image produced by the lens under test must be subjected to further electronic magnification and, preferably, to subsequent optical magnification in order to permit measurement of the variation in fringe width. Although the electron lenses subsequent to that under test may also have astigmatism, their contribution to the astigmatism of the final image is small compared to that of the lens under test because of the greater magnification to which the contribution of the lens under test is subjected. In the case of an electron microscope, therefore, the lens whose astigmatism is important is the objective lens, and its astigmatism may be observed with the aid of the succeeding projection lens and appropriate magnification of a photographic plate on which the final image produced by the projection lens is recorded.

Because the variation in fringe width with azimuth increases as focus is approached, although the average fringe width decreases, correction of a lens provided with compensating means according to my invention may advantageously begin with the taking of a series of photographs for varying conditions of average focus. In this way a photograph exhibiting maximum variation in fringe width may be selected to facilitate determination of the meridian planes of maximum and minimum power in the lens.

The appearance of the fringes varies somewhat with the sign of the departure from focus. When the object is too far from the objective lens to be brought into focus at the photographic plate by the imaging lens system, the most prominent fringes are the bright fringes which appear (in a positive print) in the dark portion of the field, i. e. in the shadow of the film around the opening. When the object is too close to the objective to be brought into focus at the plate, the most prominent fringes are the bright fringes which appear in the bright portion of the field. The "outside-of-focus" fringes occurring when the object is too far from the objective lens appear to be the most distinct and easily measurable of the out-of-focus fringes and for this reason have been used as the chief index of astigmatism. In practice, the first fringe only need be used, whichever the sign of the defocusing appearing in the photograph selected.

If, in the protograph selected for study, the fringe for all azimuths is due to defocusing of one sign, the azimuth of maximum defocusing is the direction of the normal to the edge having fringes of maximum width, and in like manner the azimuth of minimum defocusing can be determined from the edge having minimum fringe width. The azimuths of maximum and minimum defocusing will be at 90° to each other. From the appearance of the fringes, the sign of the defocusing can be determined and thus the azimuth of minimum and of maximum focal distance specified. Thus, if the fringes are "outside-of-focus" fringes (most prominent fringes the bright fringes in the dark field) the azimuth normal to the edge having the fringe of maximum width is the azimuth of minimum focal length, and vice versa. Conversely, if the fringes are "inside-of-focus" fringes (most prominent fringes the bright fringes in the bright field) the azimuth normal to the edge having the fringe of maximum width is the azimuth of maximum focal length, and vice versa. To equalize the focal distance at all azimuths, and thus correct the lens for astigmatism, the following procedure may be used: In case the azimuth of minimum focal distance coincides with the azimuth of an axis joining a pair of pins, the correction can be effected by advancing these pins toward the center electrode by the proper amount, or by retracting equally the two other pairs of pins the required amount, or by a combination of these two operations. If the azimuth of maximum focal distance coincides with a pin-pair-axis, the correction can be made by retracting this pair of pins, or advancing equally the other two pairs of pins, or by a combination of these two last-mentioned steps.

In the general case, the azimuth of neither the maximum nor the minimum focal distance coincides with a pin-pair axis. In the lens of Figs. 1 and 2, let the three pairs of compensating pins 36 be denoted I, II, and III. If the azimuth of minimum focal distance lies between the axes of pin-pairs I and II, and closer to the azimuth of pair I than to that of pair II, pair II can be advanced, and/or pair III retracted, until the minimum focal distance azimuth is swung into coincidence with pair I. Alternatively a similar operation may be carried out for the azimuth of maximum focal distance. Correction of the remaining astigmatism can then be made as described above for the condition when the axis of minimum or maximum focal distance coincides with a pin-pair axis.

Selective variation in the axial spacing of the electrodes of a multi-electrode diaphragm-type lens can be achieved with other forms of compensating electrodes than are shown in Figures 1 and 2. An alternative embodiment of my invention is shown in Figures 3 and 4. A compensating electrode 60 is shown in section in Fig. 3 in which two axially adjustable pins 62 are provided for variation of the axial electrode spacing. The pins 62 are disposed along a diameter of the electrode, as seen in Fig. 4, and may be rotated about the lens axis in one or more steps to the azimuthal position necessary in order to permit elimination of astigmatism from the lens image. The compensating electrode 60 includes an outer supporting diaphragm 64 which fits inside the lens cell so as to support the electron-optically important apertured diaphragm 66. The diaphragm 66 supports the two compensating pins 62 in tapped holes which are provided in an axially elongated extension 70 of the central diaphragm 66. To permit rotation of the central diaphragm and its compensating pins 62 about the lens axis, the central diaphragm is mounted for rotation with respect to the outer diaphragm 64 along a bearing surface 72. A retaining ring 74 is provided to permit locking the diaphragm 66 in any desired azimuth.

As in the case of the compensating electrode of the embodiment of Figs. 1 and 2, the compensating electrode 60 is assembled in original manufacture with the compensating pins 62 mounted flush with the inner face 76 of the central diaphragm 66. The compensating electrode is then assembled into the lens cell with the other electrodes of the lens and the assembled lens is tested for astigmatism and other defects in an electron microscope of which the compensating electrode forms the objective.

If the microscope has been adjusted to eliminate so far as possible other errors, a series of photographic exposures is taken to exhibit the variation with azimuth in the width of the out-of-focus diffraction fringes. The azimuth of maximum defocusing may be read from the test photograph selected as described above in connection with Figs. 1 and 2. The compensation of the lens begins with a rotation of the inner diaphragm 66 to bring the pin diameter 78 (Fig. 4) into coincidence with the azimuth of maximum or minimum defocusing. The two compensating pins are then advanced toward the center electrode by small and equal amounts, or retracted away therefrom, according to the sign of the alteration in focal distance required, and a photograph is again taken under the same conditions of focus. If the pins have been moved too far, the astigmatism may be overcorrected and thrown into a new azimuth. In such case, the pins are restored part way to their original position and a new photograph is taken. By successive adjustments of the axial position of the pins and of their azimuth 78 a setting may be found at which the fringes are of the same width for all values of azimuth. This condition represents the substantial elimination of astigmatism from the lens.

My invention has been described in terms of its use in the objective lens of a compound electron microscope as a typical application thereof. As explained above, astigmatism, although it may occur in electron lenses of any sort, is most deleterious when it appears in a lens whose image is further magnified. The invention has been further described in terms of a novel construction of the exit electrode of an objective lens because of the circumstance that it is often desirable to keep the front or entering electrode of such a lens as thin as possible and free from auxiliary equipment in order to permit the mounting of a specimen as close to the aperture of such entering electrode as possible. When the objective lens is employed to produce a substantial amount of magnification, the specimen must be supported very close to the first principal focal point of the lens, which is located immediately outside the aperture of the entering electrode The invention, however, is not restricted in its application to electron lenses for any particular use nor to the exit electrodes thereof. For example, astigmatism of any lens of an electron microscope following the objective may become objectionable in case the microscope is used for the production of diffraction patterns. The astigmatism of such a lens may be corrected in accordance with the technique hereinabove described by mounting it on a test bench in which its image will be further magnified by supplementary electron lenses to the degree necessary to make visible the diffraction fringes which are employed in the correction technique. Moreover, inasmuch as the object for lenses following the objective lens in an electron microscope consists not in a physical object but in the electron image produced by a previous lens, the object position may lie within such following lenses. Consequently the limitation on mechanical interference with the shape of their entering electrodes which is present in the case of an objective lens does not apply. Selective adjustment of the axial spacing may therefore be made between the entering and center electrodes, if desirable, instead of between the center and the exit electrodes.

I claim:

1. In an electrostatic electron lens including a plurality of apertured diaphragm electrodes each having a central aperture for the accommodation of an electron beam, a compensating electrode for the correction of astigmatism in the lens comprising an apertured diaphragm rotatable about the axis of its aperture, and two pins of conductive material mounted in the said diaphragm on opposite sides of the said aperture at equal distances therefrom, the said pins being separately movable in directions substantially parallel to the axis of the said aperture.

2. In an electrostatic electron lens composed of apertured diaphragm electrodes mounted symmetrically in a common axis, a compensating electrode for the correction of astigmatism introduced by departures of the electrodes from symmetry in the said axis, the said compensating electrode comprising a supporting diaphragm having a central bearing aperture, the supporting diaphragm being mounted with the axis of the said bearing aperture coincident with the said common axis, an apertured diaphragm mounted in the aperture of the supporting diaphragms for rotation about the said common axis, and two pins of electrically conductive material movably mounted in the apertured diaphragm at equal distances from the center thereof along a diameter thereof, the said pins being separately movable axially of the said apertured diaphragm.

GERTRUDE M. FLEMING.

REFERENCES CITED

The following references are of record in the file of this patent:

UNITED STATES PATENTS

| Number | Name | Date |
| --- | --- | --- |
| 2,445,676 | Hillier | Dec. 7, 1948 |